US006504546B1

(12) United States Patent
Cosatto et al.

(10) Patent No.: US 6,504,546 B1
(45) Date of Patent: Jan. 7, 2003

(54) METHOD OF MODELING OBJECTS TO SYNTHESIZE THREE-DIMENSIONAL, PHOTO-REALISTIC ANIMATIONS

(75) Inventors: Eric Cosatto, Highlands, NJ (US); Hans Peter Graf, Lincroft, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/500,334

(22) Filed: Feb. 8, 2000

(51) Int. Cl.$^7$ .................................................. G06T 17/00
(52) U.S. Cl. ......................................................... 345/473
(58) Field of Search .................................. 345/473–475

(56) References Cited

U.S. PATENT DOCUMENTS 5,933,151 A    8/1999   Jayant et al.

OTHER PUBLICATIONS

Thalmann et al. "Interactive Computer Animation" pp. 165–200, 1996.*
Jed Lengyel, John Snyder, "Rendering with Coherent Layers" (Microsoft Research) Proceedings of ACM SIGGRAPH p. 233–242, 1997.
Christoph Bregler, Michele Covell, Malcolm Slaney, "Video Rewrite: Driving Visual Speech with Audio" (Interval Research Corporation) Proceedings of ACM SIGGRAPH p 330–380, 1997.
Frederic Pighin, Jamie Hecker, Dani Lishinski, Richard Szeliski, David H. Salesin, "Synthesizing Realistic Facial Expressions from Photographs" (University of Washington, The Hebrew University, Microsoft Research) Proceedings of ACM SIGGRAPH p. 75–84, 1998.
Brian Guenter,Cindy Grimm, Daniel Wood, Henrique Maluar, Fredrick Pighin, "Making Faces" (Microsoft Corporation, University of Washington) Proceed of ACM SIGGRAPH p 55–66, 1998.
Paul E. DeBevec, Camillo J. Taylor, Jitendra Malik, "Modeling and Rendering Architecture from Photographs: A hybrid geometry– and image–based approach" (University of California at Berkeley).
Shenchang Eric Chen, "QuickTime® VR—An Image–Based Approach to Virtual Environment Navigation".

* cited by examiner

Primary Examiner—Almis R. Jankus

(57) ABSTRACT

A method for modeling three-dimensional objects to create photo-realistic animations using a data-driven approach. The three-dimensional object is defined by a set of separate three-dimensional planes, each plane enclosing an area of the object that undergoes visual changes during animation. Recorded video is used to create bitmap data to populate a database for each three-dimensional plane. The video is analyzed in terms of both rigid movements (changes in pose) and plastic deformation (changes in expression) to create the bitmaps. The modeling is particularly well-suited for animations of a human face, where an audio track generated by a text-to-speech synthesizer can be added to the animation to create a photo-realistic "talking head".

10 Claims, 6 Drawing Sheets

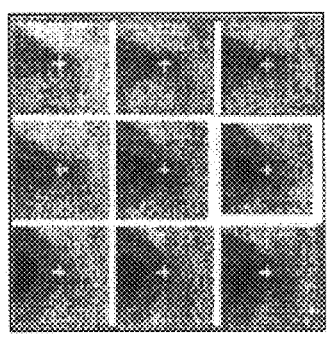
FIG. 14
FIG. 15
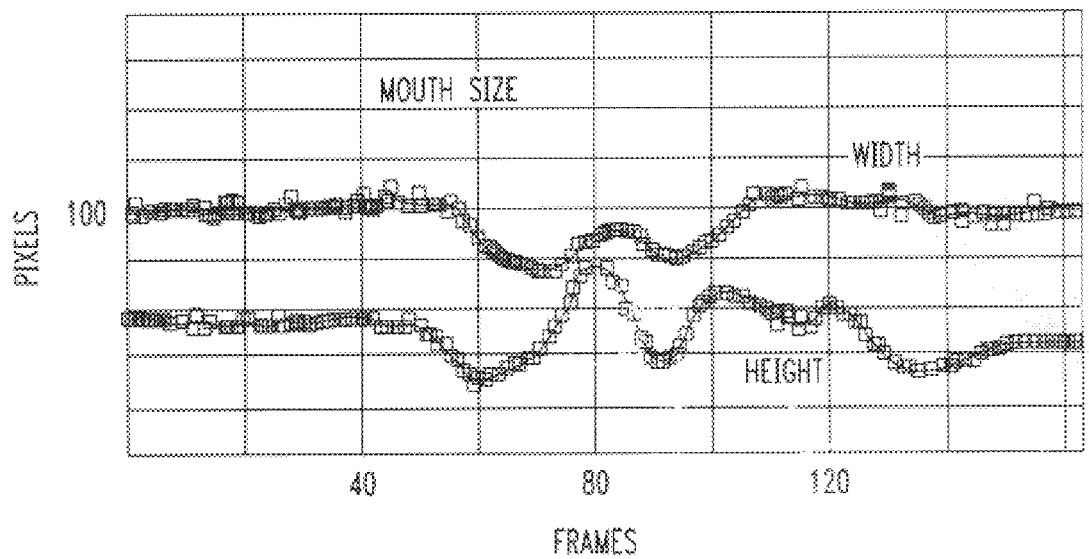
FIG. 16

FIG. 17
FIG. 18    FIG. 19
 
FIG. 20
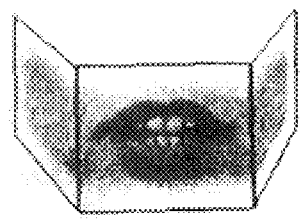
FIG. 21
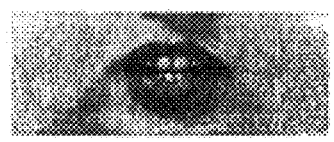

METHOD OF MODELING OBJECTS TO SYNTHESIZE THREE-DIMENSIONAL, PHOTO-REALISTIC ANIMATIONS

TECHNICAL FIELD

The present invention relates to a method for modeling three-dimensional objects and, more particularly, to modeling three-dimensional objects using a data-driven approach with separate three-dimensional image planes so as to synthesize three-dimensional, photo-realistic animations.

BACKGROUND OF THE INVENTION

Animated characters, and in particular, talking heads, are playing an increasingly important role in computer interfaces. An animated talking head immediately attracts the attention of a user, can make a task more engaging, and can add entertainment value to an application. Seeing a face makes many people feel more comfortable interacting with a computer. With respect to learning tasks, several researchers have reported that animated characters can increase the attention span of the user, and hence improve learning results. When used as avatars, lively talking heads can make an encounter in a virtual world more engaging. In today's practice, such heads are usually either recorded video clips of real people or cartoon characters lip-synching synthesized text.

Even though a cartoon character or robot-like face may provide an acceptable video image, it has been found that people respond to nothing as strongly as a real face. For an educational program, for example, a real face is preferable. A cartoon face is associated with entertainment, not to be taken too seriously. An animated face of a competent teacher, on the other hand, can create an atmosphere conducive to learning and therefore increase the impact of such educational software.

Generating animated talking heads that look like real people is a very challenging task, and so far all synthesized heads are still far from reaching this goal. To be considered natural, a face has to be not just photo-realistic in appearance, but must also exhibit realistic head movements, emotional expressions, and proper plastic deformations of the lips synchronized with the speech. Humans are trained from birth to recognize faces and facial expressions and are therefore highly sensitive to the slightest imperfections in a talking face.

Many different systems exist in the prior art for modeling the human head, achieving various degrees of photo-realism and flexibility, but relatively few have demonstrated a complete talking head functionality. Most approaches use 3D meshes to model in fine detail the shape of the head. See, for example, an article entitled "Automatic 3D Cloning and Real-Time Animation of a Human Face", by M. Escher et al., appearing in the *Proceedings of Computer Animation*, pp. 58–66, 1997. These models are created by using advanced 3D scanning techniques, such as a CyberWare range scanner, or are adapted from generic models using either optical flow constraints or facial features labeling. Some of the models include information on how to move vertices according to physical properties of the skin and the underlying muscles. To obtain a natural appearance, they typically use images of a person that are texture-mapped onto the 3D model. Yet, when plastic deformations occur, the texture images are distorted, resulting in visible artifacts. Another difficult problem is modeling of hair and such surface features as grooves and wrinkles. These are important for the appearance of a face, and yet are only marginally (if at all) modeled by most of the prior art systems. The incredible complexity of plastic deformations in talking faces makes precise modeling extremely difficult. Simplification of the models results in unnatural appearances and synthetic-looking faces.

An alternative approach to the 3D modeling is based on morphing between 2D images. These techniques can produce photo-realistic images of new shapes by interpolating between two existing shapes. Morphing of a face requires precise specifications of the displacements of many points in order to guarantee that the results look like real faces. Most morphing techniques therefore rely on a manual specification of the morph parameters, as discussed in the article "View Morphing", by S. M. Seitz et al., appearing in *Proceedings of SIGGRAPH '96*, pp. 21–30, July 1996. Others have proposed image analysis methods where the morph parameters are determined automatically, based on optical flow. While this approach gives an acceptable solution to generating new views from a set of reference images, the proper reference images must still be found to initialize the process. Moreover, since the techniques are based on 2D images, the range of expressions and movements they can produce is rather limited.

Recently, there has been a surge of interest in sample-based techniques (also referred to as data-driven) for synthesizing photo-realistic scenes. These techniques generally start by observing and collecting samples that are representative of a signal to be modeled. The samples are then parameterized so that they can be recalled at synthesis time. Typically, samples are processed as little as possible to avoid distortions. One of the early successful applications of this concept is QuickTime® VR, as discussed in the article "QuickTime® VR—An Image-Based Approach to Virtual Environment Navigation", by E. L. Chen et al., appearing in *Proceedings SIGGRAPH '95*, pp. 29–38, July 1995. The Chen et al. system allows panoramic viewing of scenes as well as examining objects from all angles. Samples are parameterized by the direction from which they were recorded and stored in a two-dimensional database.

Recently, other researchers have explored ways of sampling both texture and 3D geometry of faces, producing realistic animations of facial expressions. One example of such sampling is discussed in an article entitled "Synthesizing Realistic Facial Expressions from Photographs", by F. Pighin et al., appearing in *Proceedings SIGGRAPH '98*, pp. 75–84, July 1998. The Pighin et al. system uses multiple cameras or facial markers to derive the 3D geometry and texture of the face in each frame of video sequences. However, deriving the exact geometry of such details as groves, wrinkles, lips and tongue as they undergo plastic deformations prove a difficult task. Extensive manual measuring in the images is required, resulting in a labor-intensive capture process. Textures are processed extensively to match the underlying 3D model and may loose some of their natural appearance. None of these prior art systems have yet been demonstrated for speech reproduction.

A talking-head synthesis technique based on recorded samples that are selected automatically has been proposed in the article "Video Rewrite: Driving Visual Speech with Audio", by C. Bregler et al, appearing in *Proceedings SIGGRAPH '97*, pp. 353–360, July 1997. The Bregler et al. system can produce videos of real people uttering text they never actually said. It uses video snippets of tri-phones (three sequential phonemes) as samples. Since these video snippets are parameterized with the phoneme sequence, the resulting database is very large. Moreover, this parameterization can only be applied to the mouth area, precluding the use of other facial parts, such as eyes and eyebrows, which are known to carry important conversational clues.

T. Ezzat et al., in an article entitled "MikeTalk: A Talking Facial Display Based on Morphing Visemes", appearing in the *Proceedings of Computer Animation*, pp. 96–102, June 1998, describe a sample-based talking head system that uses morphing to generate intermediate appearances of mouth shapes from a very small set of manually selected mouth samples. While morphing generates smooth transitions between mouth samples, this system does not model the whole head and does not synthesize head movements and facial expressions. Others have presented a sample-based talking head that uses several layers of 2D bit-planes as a model. Neither facial parts nor the whole head are modeled in 3D and, therefore, the system is limited in what new expressions and movements it can synthesize.

Thus, a need remains in the art for a method of modeling three-dimensional objects in general and, particularly, for an animated talking head model that is photo-realistic and is capable of producing whole head movements and realistic facial expressions for a variety of computer graphic applications.

SUMMARY OF THE INVENTION

The need remaining in the prior art is addressed by the present invention, which relates to a method for modeling three-dimensional objects and, more particularly, to modeling three-dimensional objects using a data-driven approach with separate three-dimensional image planes so as to synthesize three-dimensional, photo-realistic animations.

In accordance with the present invention, a data-driven approach is used, where a three-dimensional object, such as a talking person, is defined by a set of three-dimensional planes that approximate the shape and surrounding area of the object. The object is then recorded on video and image recognition is applied to automatically extract bitmaps of each three-dimensional plane. In the case of modeling a human face, the set of three-dimensional planes correspond to a set of pre-defined facial parts. These bitmaps are then normalized and parameterized before being entered into a database. For the synthesis of a human head, a text-to-speech synthesizer provides the audio track, as well as a phoneme string and trajectory that calculates motion for all the facial parts, including the whole head. These trajectories provide the parameters for selecting the proper bitmaps from the database. Smoothing and blending are applied to these 'strings' of bitmaps to eliminate hard transitions and create a seamless animation for each facial part. The result is a talking head that resembles very closely the person who was originally recorded.

It is an aspect of the present invention that the use of sample-based modeling from video images preserves a high level of detail in the appearance of the object. For example, by recording real movements of a head and lips, and reusing them for the synthesis, a model is obtained that is able to produce realistic lip and head movements, as well as emotional expressions.

In defining the inventive modeling of a three-dimensional object, the flexibility of 3D models is combined with the realism of images. A key problem with prior art sample-based techniques, as discussed above, is the ability to control the number of image samples that need to be recorded and stored. For example, a face's appearance changes due to talking, emotional expressions and head orientation, leading to a combinatorial explosion in the number of different appearances. In accordance with the teachings of the present invention, the number of samples is kept at a manageable level by dividing the object into a hierarchy of parts (each part defined by a three-dimensional plane), where each part is modeled independently. This independent modeling results in a compact model that can create animations with head movements, speech articulation and different emotional expressions.

In a preferred embodiment of the present invention for generating a "talking head" model, the head and its facial parts are first modeled and a suitable sample process is used to capture the data. In order to capture accurately realistic speech postures, human subjects speak short text sequences in front of a camera. A face recognition system then automatically analyzes this video footage and selects the proper samples. The needed bitmaps are then extracted from the video frames and normalized and parameterized for easy access in a database. Finally, the synthesis of the talking head animation is driven by a string of phonemes to create the photo-realistic talking head.

Other and further aspects and embodiments of the present invention will become apparent during the course of the following discussion and by reference to the accompanying drawings.

BRIEF DESCRIPTION OF THE DRAWINGS

Referring now to the drawings:

FIG. 14 illustrates nine examples of the position of the left lip corner;

FIG. 15 contains dimensions of the mouth used in the lip corner examples of FIG. 14;

FIG. 16 is a convolution of a selected lip corner image (kernel) with a mouth image;

FIG. 17 illustrates the definition of a feature point from the convolution of FIG. 16;

FIG. 18 contains a diagram of a known head image;

FIG. 19 is a projection of 3D models into the image plane;

FIG. 20 is the image of FIG. 19 with marking of the extent of each feature;

FIG. 21 is a normalized bitmap representation of the marked image of FIG. 20;

DETAILED DESCRIPTION

Throughout the course of the following discussion, the modeling method of the present invention will be discussed in terms of creating a three-dimensional, photo-realistic "talking head". It is to be understood that the three-dimensional modeling method is in general applicable to creating an animation of any three-dimensional object.

The "talking head" animation is considered to be only an exemplary tool for understanding the underlying principles of creating a set of three-dimensional planes and creating a data base of images for each plane for later use in an animation process.

Creation of a Data-Driven Model

Overview

Figure 1:
FIG. 1 illustrates a base face to be used as a substrate for images formed in accordance with the present invention.
Figure 2:
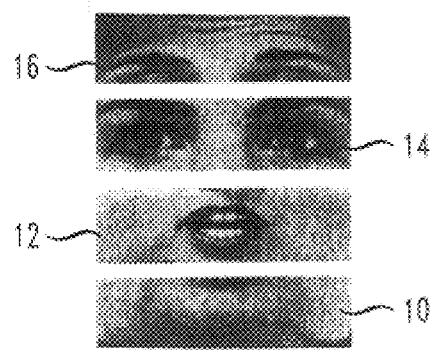
FIG. 2 illustrates an exemplary set of separate facial parts that are modeled as separate units in accordance with the present invention.

In a particular embodiment of the present invention useful in modeling a human head so as to synthesize a three-dimensional, photo-realistic "talking head", the head is first defined as comprising a number of separate three-dimensional planes, including as a first three-dimensional plane a "base face", as shown in FIG. 1. The base face covers the area of the whole face and serves as a substrate onto which the facial parts (the remaining three-dimensional planes, as discussed below) will be integrated. In accordance with this particular embodiment of the present invention, the separate, independent facial parts, as illustrated in FIG. 2, are defined as: mouth with cheeks 10, jaw 12, eyes 14 and forehead with eyebrows 16. For the purposes of this embodiment, the nose and ears are not modeled separately, but are considered as part of the base face of FIG. 1.

Figure 3:
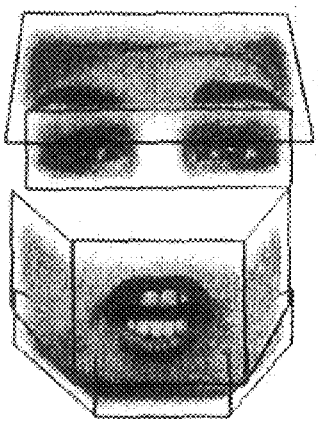
FIG. 3 is a forward-looking pose of a base face.
Figure 4:
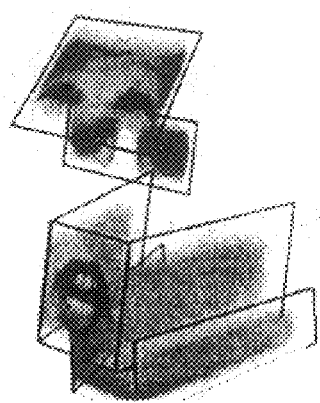
FIG. 4 contains a rotated head pose.

In creating the 3D model of the present invention, the shape of each facial part is first approximated with a small number of planes. This set of planes is used as a guide to map the facial parts onto the base face in a given pose. For example, FIG. 3 illustrates these facial parts integrated into a fall-face, forward-looking pose, while FIG. 4 illustrates these same facial parts on a strongly rotated head pose, illustrating the 3D shape of the model. In accordance with the present invention, the positions and orientations of the set of planes follows the movements of the head, yet their shapes remain constant, even when the corresponding facial parts undergo plastic deformations. Therefore, a model plane is more like a local window onto which a facial part is projected than a polygon of a traditional 3D model.

For each facial part, sample bitmaps are then recorded that cover the range of possible appearances produced by plastic deformations. No separate bitmaps are recorded to account for different head orientations. For the base face, bitmap samples are recorded with the head in different orientations. One exemplary range of head rotations that may be used in practicing the present invention is ±15°, although it is to be understood that any suitable range of rotation may be used, with additional bitmap samples recorded if a larger range of head rotations is utilized.

It is to be understood that there is no unique way of decomposing a face into parts, and no part of the face is truly independent from the rest. Muscles and skin are highly elastic and tend to spread a deformation in one place across a large part of the whole face. The particular decomposition described herein in association with the present invention was selected after studying how facial expressions are generated by humans, and how they are depicted by artists and cartoonists.

Figure 5:
FIG. 5 illustrates a bitmap projection into the base face using warping.
Figure 6:
FIG. 6 illustrates blending of bitmaps in the face of FIG. 5.

To generate a face with a certain mouth shape and emotional expression, the proper bitmaps are chosen for each of the facial parts. The head orientation is known from the base face, so the bitmaps can be projected onto the base face using simple warping, as shown in FIG. 5. This operation is similar to traditional texture mapping. The difference with traditional 3D modeling techniques is that for plastic deformations, different bitmaps are selected, rather than trying to squeeze one single bitmap into any new shape. Only rigid movements such as rotation and translation of the whole head plus the rotation of the jaw are modeled. The bitmaps of the facial parts are integrated into the base face with proper "feathering" (i.e., alpha-blending at the edges), so that they blend more smoothly into the base face without introducing artifacts (see FIG. 6).

Figure 7:
FIG. 7 illustrates the same bitmaps as used in FIGS. 5 and 6, projected onto a different base face.

In this description of the present invention, only a limited range of front views that are typical for movements during spontaneous speech are considered. Bitmaps, therefore, do not need to be recorded with different head orientations for each of the facial parts. Empirical studies have shown that for a range of ±15° of rotation (for example), warping does not introduce serious distortions in the bitmaps that would be considered unnatural. In accordance with the present invention, therefore, the discussion herein is limited to a range that can be covered with a single set of bitmaps and model planes, as shown in FIGS. 1–7. The model can, however, be adapted to cover a wide range of orientations. Sample bitmaps have to be recorded from different angles, and the planes of the model need to be adjusted accordingly. FIG. 7 illustrates the same facial parts, projected onto a different base face.

Capturing Sample Bitmaps

In the system of the present invention, three-dimensional object modeling, such as a head modeling, is made in two steps. In the case of modeling a human head, a few measurements are first made on the subject's face to determine its geometry, namely, the relative positions of eye corners, nostrils, mouth corners and the bottom of the chin. Using these measurements, the model planes are adapted for each facial part. Since this is done only once, there is little incentive to automate it. Techniques exist in the prior art that can adapt a generic head model from video sequences showing head movements. This may be useful if only video footage exists without the person being present.

Once the 3D model is defined, each face part is populated with bitmaps representative of its appearances. A person is recorded while freely speaking a few short sentences to obtain all of the different mouth shapes. For the illustrated examples discussed herein, a women spoke 14 phrases, each two to three seconds long. It is intended to maintain the capture process as simple and non-intrusive as possible, since there is an interest in capturing the typical head movements during speech as well as special mimics and unique ways of articulating words. In particular, any head restraints or forced poses should be avoided, such as requiring the subject to watch constantly in a given direction. The need of multiple cameras is also avoided by knowing the positions of a few points in the face, allowing recovery of the head pose using techniques that will be described hereinafter.

Lip movements can be extremely fast, which may cause blurry images when the frame rate is not high enough.

Recording 60 fields per second instead of 30 frames, or using a shutter can solve this problem without having to resort to expensive cameras. Luminance, as well as hue of the facial parts and the base face, are adjusted so that they will blend seamlessly. By making sure that the illumination is reasonably homogeneous, excessive color corrections that may introduce artifacts can be avoided. Moreover, having a background of uniform and neutral color makes finding the location of the head relatively easy. In a preferred embodiment of the present invention, frames of 560×480 pixels in size are captured, with the head being about four-fifths of this height, ensuring a high level of fidelity in rendering details of facial features, skin and hair.

Recognition System

Sample-based synthesis of talking heads depends on a reliable and accurate recognition of the face and the positions of the facial features. Without an automatic technique for extracting and normalizing facial features, a manual segmentation of the images has to be done. Considering that samples of all lip shapes, different head orientations, and several emotional expressions are needed, thousands of images have to be searched for the proper shapes. If it is also desired to analyze the lip movements during transitions between phonemes, hundreds of thousands of images need to be analyzed. Obviously, it is not feasible to perform such a task in a manual fashion.

The main challenge for a face recognition system is the high precision with which the facial features have to be located. An error as small as a single pixel in the position of a feature noticeably distorts the pose estimation of the head. To achieve such a high precision, the analysis of the present invention proceeds in three steps, each with an increased resolution. The first step finds a coarse outline of the head, plus estimates of the positions of the major facial features. In the second step, the areas around the mouth, the nostrils and the eyes are analyzed in more detail. The third step, finally, zooms in on specific areas of facial features, such as the corners of the eyes, of the mouth and of the eyebrows and measures their positions with high accuracy.

Figure 8:
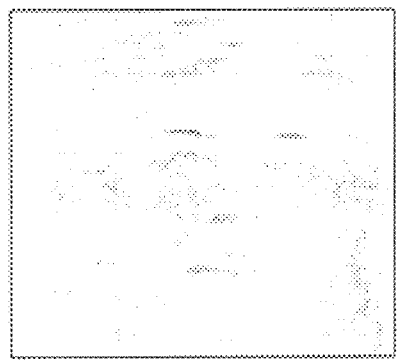
FIG. 8 illustrated a band-pass filtered image of the head.
Figure 9:
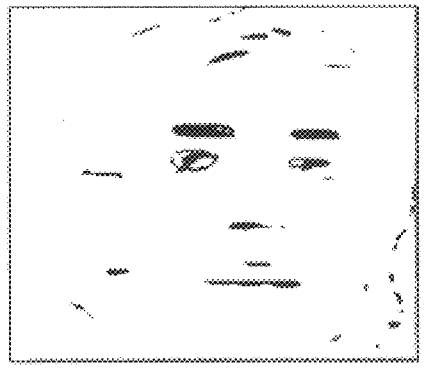
FIG. 9 is a binary image of the head of FIG. 8.

In the first step, the whole image is searched for the presence of heads, and their locations are determined. Each frame is analyzed with two different algorithms. The first type of analysis is a color segmentation to find the areas with skin colors, as well as colors representative of the hair. The second type of analysis segments the image based on textures and shapes. This analysis uses only the luminance of the image. First, the image is filtered with a band-pass filter, removing the highest and lowest spatial frequencies, as shown in FIG. 8. Next, a morphological operation followed by adaptive thresholding is performed, resulting in a binary image where areas of facial features are marked with blobs of black pixels, as depicted in FIG. 9. The color analysis, as well as the texture analysis, produces sets of features. Combinations of these features are evaluated with classifiers, testing their shapes and relative positions. For example, an area marked by the color analysis as a candidate of a face area is combined with candidates of eye areas produced by the texture analysis. If relative sizes and positions match closely those of a reference face, this combination is evaluated further and combined with other features. Otherwise, it is discarded.

In order to save computation time, the analysis starts with simple representations, and only if the result is not satisfactory, a more complex representation is used. For example, when a classifier tries to determine whether three features represent two eyes and a mouth, it takes into account, during a first pass, only the center of mass of each feature, and measures their relative positions. If the results are ambiguous, the analysis is repeated looking also at the shape of each feature, using the outlines of each connected component in the image.

Figure 10:
FIG. 10 indicates the major facial features as images from FIGS. 8 and 9.

This bottom-up approach of evaluating combinations of features reliably and quickly produces the location of the head, as well as the positions of the major facial features, as shown in FIG. 10. In the videos used for extracting samples, there is usually only one person present and the lighting is fairly uniform. Moreover, the background is static with little texture. Locating the head in images of such quality is rather easy and can even be done at a strongly reduced resolution without loosing reliability. Typically, images are downsampled to a quarter or a ninth of the original size for this analysis in order to speed it up.

Locating Facial Features

Figure 11:
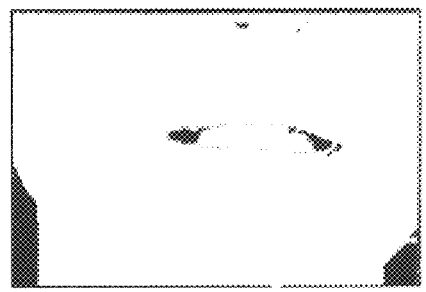
FIGS. 11–13 illustrate the assignment of color to the mouth cavity, teeth and lips, respectively.
Figure 12:
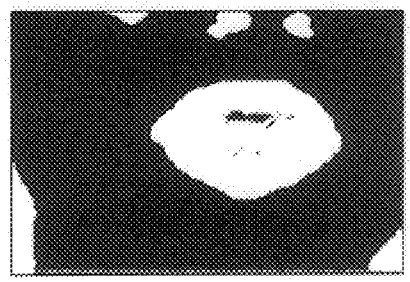
Figure 13:
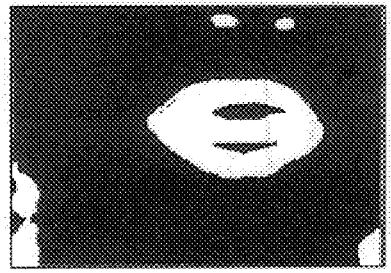
Figure 13:
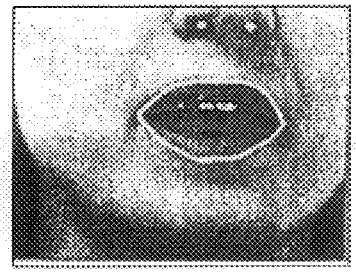

Finding the exact dimensions of the facial features is a difficult process, since the person being recorded is moving the head and is changing facial expressions while speaking. This can lead to great variations in the appearance of a facial feature and can also affect the lighting conditions. For example, during a nod, a shadow may fall over the eyes. Therefore, the analysis described hereinabove does not always produce accurate results for all facial features and there remains a need to further analyze the areas around the eyes, mouth and lower end of the nose. In particular, the algorithm proceeds by analyzing the color space, periodically retraining the space with a small number of frames. For example, the area around the mouth may be cut out from five frames and with a leader-cluster algorithm, the most prominent colors in the area are identified. By analyzing the shapes of the color segments, the colors can be assigned to the different parts, such as the mouth cavity (FIG. 11), the teeth (FIG. 12) and the lips (FIG. 13). By repeating the color calibration periodically, changes in the appearances of the facial features can be tracked. The texture analysis may also be adapted to the particular facial feature under investigation by adjusting the filter parameters to the size and shape of a feature. In this way, the combination of texture and color analysis produces reliable measurements of the positions and outlines of the facial features.

High Accuracy Feature Points

For measuring the head pose, a few points in the face are first measured with high accuracy, preferably with an error of less than one pixel. The techniques described above tend to produce variations of, for example, ±2 pixels for the eye corners. Filtering over time can improve these errors significantly, yet a more precise measurement is still preferable. In accordance with the present invention, therefore, a third level of analysis is added to measure a few feature points with the highest accuracy. From a training set of 300 frames, a few representative examples of one feature point are selected. For example, for measuring the position of the left lip corner, nine examples are selected, as shown in FIG. 14. These samples are chosen based on the dimensions of the mouth as indicated in the graph of FIG. 15. Therefore, the training procedure of the present invention selects mouth images with three different widths and three different heights. From these images, the areas around the left corner are cut out. For analyzing a new image, one of these sample images is chosen, namely the one where the mouth width and height are most similar (as outlined in FIG. 15), and this kernel is scanned over an area around the left half of the mouth.

To measure the similarity between the kernel and the area being analyzed, both are filtered with a high-pass filter before multiplying them pixel by pixel, as shown in FIG. 16.

This convolution identifies very precisely where a feature point is located (FIG. 17). The standard deviation of the measurements is typically less than one pixel for the eye corners and filtering over time reduces the error to less than 0.5 pixels. A similar analysis can be performed for the eye corners, and the corners of the eyebrows.

The time required for this operation scales with the kernel size, multiplied by the size of the analyzed area. It can be found empirically that a kernel size of 20×20 pixels provides adequate robustness, and analyzing an area of 100×100 pixels has been found to take less than 100 msec on a 300 MHz PC.

The measured features, as mentioned above, include the mouth, nostrils, eyes and eyebrows. Knowing the positions and shapes of these features has been found to be sufficient for identifying visemes of the mouth and the most prominent emotional expressions. At times, the interior of the mouth may also be analyzed to obtain a better measure of lip protrusion and stress put on the lips.

Pose Estimations

For pose estimation, a conventional prior art technique, using six feature points in the face, may be used. The six feature points include four eye corners and the two nostrils. This technique starts with the assumption that all model points lie in a plane parallel to the image plane (corresponds to an orthographic projection of the model into the image plane, plus a scaling). Then, by iteration, the algorithm adjusts the model points until their projections into the image plane coincide with the observed image points. The pose of the 3D model is obtained by iteratively solving the following linear system of equations:

$$\begin{cases} M_i \cdot \frac{f}{Z_0} i = x_i(1 + \varepsilon_i) - x_0 \\ M_i \cdot \frac{f}{Z_0} j = y_i(1 + \varepsilon_i) - y_0 \end{cases}$$

where $M_i$ is the position of object point i, i and j are the first two base vectors of the camera coordinate system in object coordinates, f is the focal length and $z_0$ is the distance of the object origin from the camera. i, j, and $z_0$ are the unknown quantities to be determines. $x_i$, $y_i$ is the scaled orthographic projection of the model point I, $x_0$, $y_0$ is the origin of the model in the same plane, $e_i$ is a correction term due to the depth of the model point, where $\epsilon_i$ is adjusted in each iteration until the algorithm converges. This algorithm has been found to be very stable, also with measurement errors, and converges in just a few iterations.

If the recognition module has failed to identify eyes or nostrils on a given frame, that frame is simply ignored during the model creation process. The recognition module marks the inner and outer corners of both eyes, as well as the center of the nostrils. The location of the nostrils is very reliable and robust, and it is possible to derive their position with sub-pixel accuracy by applying low-pass filtering on their trajectories. The location of the eye corners is less reliable because their positions change slightly during closures. Therefore, frames on which the eyes are closed may also be ignored. The errors in the filtered position of these feature points are typically less than one pixel. A study of the errors in the pose resulting from errors of the recognition is below in Table I. All possible combinations of recognition errors are calculated for a given perturbation (with 6 points and 9 possible errors, all $9^6$=53441 posses have been computed).

TABLE I

|         | 0.5  | 1.0  | 1.5  | 2.0  | 1.0 (AVG) |
|---------|------|------|------|------|-----------|
| X-angle | 1.6  | 3.3  | 5.0  | 6.9  | 0.7       |
| Y-angle | 1.4  | 2.8  | 4.3  | 5.8  | 0.67      |
| Z-angle | 0.6  | 1.2  | 1.9  | 2.6  | 0.27      |
| Z-pos   | 8.9  | 18.3 | 27.4 | 36.6 | 5.6       |

The values shown in this table are the maximum errors in the calculated pose (x, y and z angles in degrees and z position (distance) to the camera in nm) for perturbations of the measured feature points by: 0.5, 1, 1.5, and 2 pixels. The last column shows an average error for a perturbation of 1 pixel. The subject was at a distance of im from the camera. The camera focal length was 15 mm and its resolution was 560×480 pixels.

Population of the Database

Samples of Facial Features

There are two choices in selecting the unit of samples, as discussed above—single images or short sequences of images. One prior art technique uses video sequences of triphones as the basic sample unit. This results in large databases, but allows a semantically meaningful parameterization and requires fewer samples for synthesizing a new sequence. In the system of the present invention, both units are used: single frames (to keep the database size low) and short sequences (where they are clearly advantageous for animation). For facial parts, single images are primarily used. Since the recognition module provides extensive information about the shape of facial features, it is possible to reliably parameterize them. For cases where the appearance of the facial part cannot be properly described by the chosen parameters, e.g. a smiling mouth, short sequences are stored, and labeled with their appearance. For the base face, short sequences of typical head movements are also stored.

Before the image samples are entered into the database, they are corrected in shape and scale to compensate for the different head orientations when they were recorded. From the recognition module, the position and shape of the facial parts, as well as the pose of the whole head, is known (as shown in FIG. 18). To extract facial parts from the image, the planes of the 3D model are first projected into the image plane (illustrated in FIG. 19). The projected planes then mark the extent of each facial feature (see FIG. 20). These areas are "un-warped" into the normalized bitmaps of FIG. 21. Any information about the shape produced by the recognition module is also mapped into the normalized view and stored along with the bitmap in a data structure. For example, the recognition module produces the outline of lips encoded as a sequence of points. All these points are then mapped into the normalized plane before entering them into the database.

Figure 22:
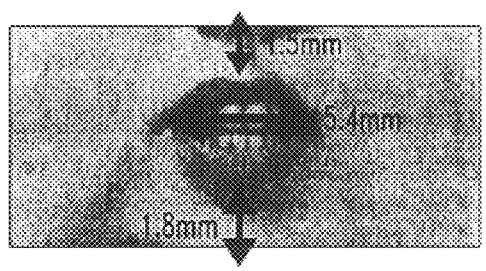
FIG. 22 illustrates the mouth as defined by the width, maximum outer lip contour and minimum outer lip contour.

Once all of the samples of a face part are extracted from the video sequences and normalized, they need to be labeled and sorted in a way that allows for efficient retrieval. To parameterize a facial part, some of the measurements produced by the recognition module are chosen. FIG. 22, for example, illustrates a mouth defined by three parameters: (1) the width (distance between the two corner points); (2) the y-position of the upper lip (y-maximum of the outer lip contour); and (3) the y-position of the lower lip (y-minimum of the outer lip contour). Samples of other facial parts are parameterized in a similar way.

Beside geometric features, parameters describing the appearance of a facial part may also be used. The three-step filtering process described above in association with face location provides a convenient way of characterizing the texture of a sample. By filtering a bitmap with a band-pass filter, and measuring the intensity in three or four frequency bands, a characterization of the texture is obtained that can be used to parameterize the samples. In this way, samples that have the same geometrical dimensions, but a different visual appearance, can be differentiated.

Figure 23:
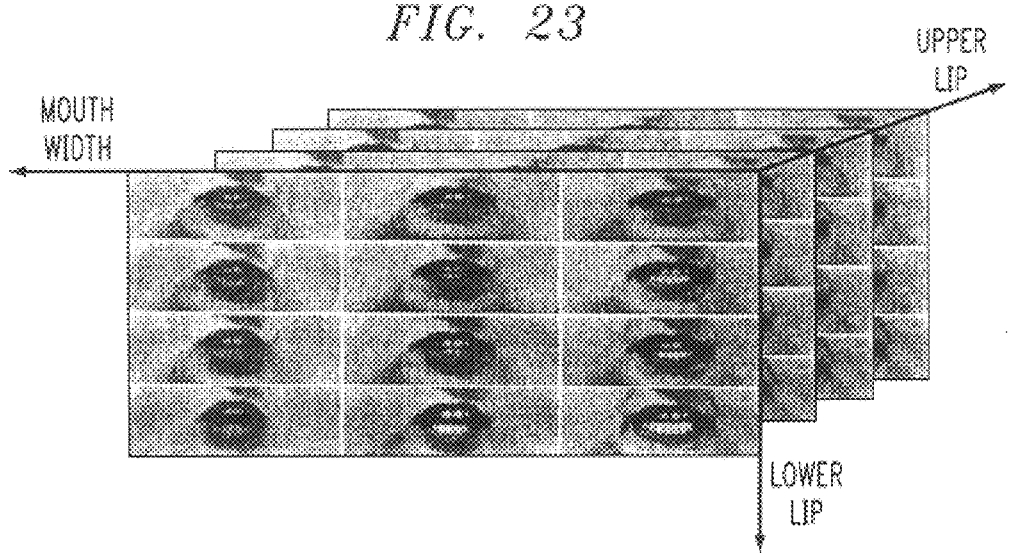
FIG. 23 illustrates an n-dimensional grid of quantized facial parts.

The space defined by the parameters of a face part is quantized at regular intervals. As shown in FIG. 23, this creates an n-dimensional grid, where n is the number of parameters, and each grid point represents a pre-defined shape. In particular, the number of intervals on the axes of the grid are first chosen, then all samples are scanned and the distribution of each parameter analyzed. Based on this information, the exact position of the grid intervals are set.

Searching through all samples, each grid point can be populated with the k closest candidate bitmaps. Three parameters govern the size t of the resulting database of samples: (1) the number of parameters n; (2) the number of intervals p on each axis of the parameter space; and (3) the number of samples k kept at each grid point. In particular, t can be defined by the following expression:

$$t = k \prod_{i=0}^{i<n} p_i$$

Having multiple samples per grid point, i.e. k>1, is useful for several reasons. In the "debugging" phase of the database, an operator can choose the best of a small set of automatically selected samples. Another reason to keep multiple samples is that expressions such as a smile, or putting pressure on the lips, produce visually different mouth shapes for one set of parameters. One could increase the dimensionality of the parameter space, yet this would increase the number of samples drastically. By selectively populating grid points with more than one sample, such cases can be covered more efficiently.

There is a trade-off between the size of the database and the quality of the animation that it can generate. For example, reducing the number of parameters will decrease the precision with which a sample can be characterized, thus resulting in a poor selection of samples. Alternatively, reducing the number of intervals means bigger differences between neighboring samples and therefore the need to synthesize more transition samples that are of lower visual quality. In the exemplary embodiment described above, the mouth shape is characterized by three parameters (width, highest point of upper lip and lowest point of lower lip), dividing them into four, four and three intervals, respectively, resulting in a database of 48 mouth samples. About 40 additional samples are necessary to store the remaining facial parts (jaw, eyes, forehead & eyebrows). Each sample is about 5 kB (compressed using JPEG), resulting in about ½ MB of storage. Short sequences for the base face, totaling about 2 MB (compressed using MPEG 2), are also needed. As a result, the system of the present invention yields a very compact database of little over 2 MB that is capable of producing high-resolution (560×480 pixels) animations. Further, by scaling down the resolution, animation can be generated from a database of a few hundred kilobytes.

The construction of a database as described thus far has been fully automated. Since no recognition system is 100% accurate, some erroneous samples will be included in the database. Errors of the recognition module include alignment errors and selection errors. Alignment errors are due to errors in the position of features, producing misaligned samples. Selection errors happen when parameters are not measured accurately. It is also possible that, for a given image, the chosen parameters do not characterize the appearance with sufficient accuracy. For example, two lip shapes may have the same parameters, yet look different because in one image the speaker puts more pressure on the lips. Such effects are corrected by synthesizing short animation sequences and verifying visually that they look smooth.

A graphical interface can be used as part of the present invention, where the graphical interface allows an operator to browse through the database, correct angles and positions of any sample, and select new samples from a list of candidates if the sample at one grid point is not deemed accurate. The system also tells the user which phonemes are mapped to the currently selected mouth viseme. This is useful to avoid articulation problems in the animation. By looking at short animations, the visual continuity of the samples in the database can be verified. Indeed, with this graphical interface tool, an operator can create a database in less than one hour.

Animation—Creation of a Talking Head

As mentioned above, a text-to-speech (TTS) synthesizer provides the audio track as well as a phoneme string for animation, where the synthesizer calculates motion trajectories for all of the facial parts, as well as the base face. These trajectories provide the parameters for selecting the proper bitmaps from the database. Smoothing and blending may be applied to these "strings" of bitmaps to eliminate hard transitions and create a seamless animation for each facial part. The result is a talking head that resembles—very closely—the person who was originally recorded.

Choosing n parameters to describe a sample creates an n-dimensional space of possible appearances. An animation produces a parametric function (or trajectory) through this space with time as a parameter, as shown below:

$$traj(t)=\{p_0(t), p_1(t), \ldots, p_n(t)\},$$

Figure 24:
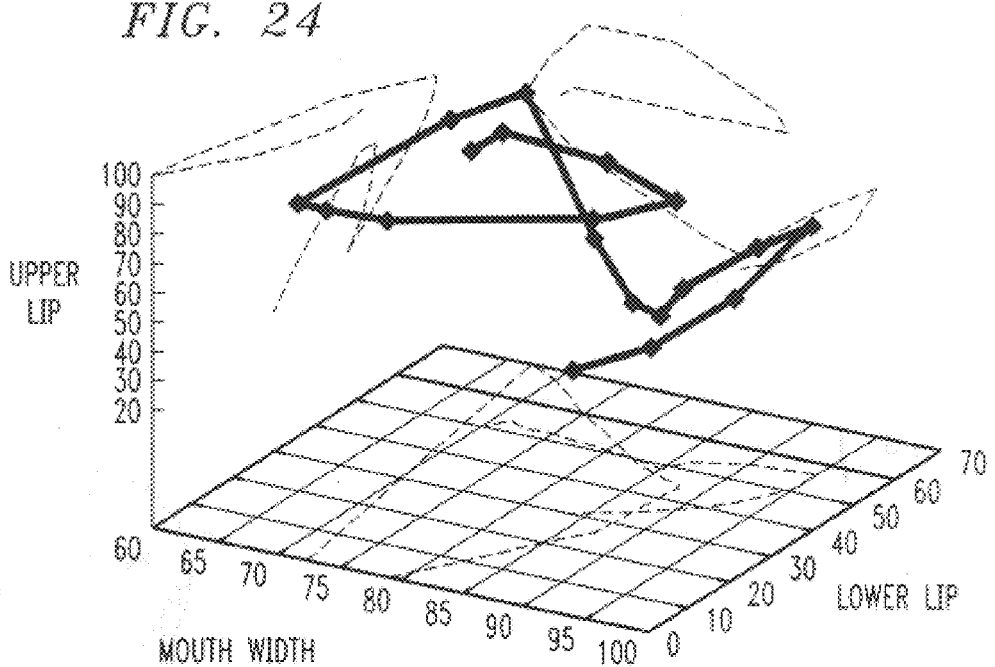
FIG. 24 illustrates the trajectory for 3D mouth parameters for the phrase "I bet that"

FIG. 24 shows the resulting trajectory in the three dimensional space of mouth parameters for the utterance: "I bet that". All the parameter values are given below in Table 2, which is an example of the rule-based algorithm used to filter abrupt transitions arising from quantizing of a trajectory into a string of samples:

TABLE 2

| Time (millisec.) | Frame number | phoneme | Mouth width | Lower lip position | Upper lip position | Grid index | Grid index (after filter) | transition |
|---|---|---|---|---|---|---|---|---|
| 1467 | 44 | ah | 70 | 51 | 77 | 222 | 212 | 0.67 |
| 1500 | 45 | ah | 71 | 55 | 79 | 222 | 322 | 0.67 |
| 1533 | 46 | ah | 80 | 50 | 77 | 322 | 322 | |
| 1567 | 47 | iy | 88 | 44 | 74 | 312 | 322 | 0.67 |

TABLE 2-continued

| Time (millisec.) | Frame number | phoneme | Mouth width | Lower lip position | Upper lip position | Grid index | Grid index (after filter) | transition |
|---|---|---|---|---|---|---|---|---|
| 1600 | 48 | iy | 87 | 36 | 78 | 312 | 202 | 0.67 |
| 1633 | 49 | b | 79 | 24 | 88 | 312 | 202 | |
| 1667 | 50 | b | 74 | 19 | 93 | 302 | 202 | |
| 1700 | 51 | b | 72 | 34 | 89 | 212 | 202 | |
| 1733 | 52 | ch | 69 | 60 | 82 | 222 | 202 | 0.67 |
| 1767 | 53 | ch | 67 | 78 | 76 | 232 | 221 | 0.67 |
| 1800 | 54 | ch | 70 | 71 | 62 | 221 | 221 | |
| 1833 | 55 | ch | 77 | 53 | 42 | 321 | 221 | 0.67 |
| 1867 | 56 | t | 83 | 44 | 31 | 311 | 321 | 0.67 |
| 1900 | 57 | dh | 85 | 48 | 30 | 320 | 321 | |
| 1933 | 58 | ae | 86 | 51 | 35 | 321 | 321 | |
| 1967 | 59 | ae | 91 | 54 | 53 | 321 | 321 | |
| 2000 | 60 | ae | 95 | 58 | 74 | 322 | 321 | 0.67 |
| 2033 | 61 | ae | 95 | 53 | 67 | 322 | 311 | 0.67 |
| 2067 | 62 | ae | 93 | 41 | 48 | 311 | 311 | |
| 2100 | 63 | t | 89 | 32 | 32 | 311 | 311 | 0.67 |
| 2133 | 64 | t | 84 | 29 | 27 | 310 | 310 | 0.67 |

To create a video animation at 30 frames per second, the trajectory is sampled every 33.33 milliseconds. Then, for each sample point, the closest grid entry and its associated bitmap is chosen. The parameters describing feature shapes are chosen such that transitions between neighboring samples look smooth. This guarantees that the resulting animation is also visually smooth. Nevertheless, the string of samples is the result of quantization, and without some minor filtering, quantization errors might result in abrupt transitions or visible artifacts. A rule-based filtering algorithm can therefore be used to eliminate these artifacts. The example in Table 3 illustrates the kind of rules that may be used.

TABLE 3

```
foreach substring in string{
    if (substring.length < minlength, and
        substring is a plosive)
        substring is enlarged using surrounding substrings;
    else if (substring.length < minlength)
        substring takes the value of surrounding substring
}
```

To smooth transitions between samples even further, transition samples between two existing samples can be synthesized by blending them together using the following equation:

$$pix_{i,j} = \alpha \cdot pix_{i,j} + (1-\alpha) \cdot pixb_{i,j}$$

$$pix_{i,j} = \alpha \cdot pix_{i,j} + (1-\alpha) \cdot pixb_{i,j}$$

$$\alpha = \frac{t - t_0}{t_1 - t_0}, t \in [t_0, t_1]$$

Figure 25:
FIG. 25 illustrates a sequence of selected mouth shapes, with transition frames marked with a "T"

During the transition interval from $t_0$ to $t_1$ the resulting pixel pix is a blend of the corresponding pixels from sample a (pixa) and sample b (pixb). The number of samples that are used to create a transition varies depending on the sampling rate of the trajectory and the duration of the samples. When the database contains few samples, the visual difference between samples is larger and more sophisticated techniques such as morphing provide better results. Morphing is, however, computationally more expensive and requires correspondence points. When the visual difference between samples is reasonably low, the simpler, cheaper blending technique is adequate. FIG. 25 shows the sequence of mouth shapes selected from the database, plus the transition shapes, marked with a T.

The mouth of the talking head model is animated in accordance with the present invention from a string of phonemes. Each phoneme is mapped to its visual equivalent, a viseme (mouth sample). To account for coarticulation, any suitable model known in the prior art can be used. As is well-known in the art, coarticulation refers to the influence that the previous and following phonemes have on the shape of the lips of the current phoneme being uttered.

Instead of directly mapping a phoneme to a viseme, each parameter of a viseme $v_p$ is derived from a sequence of phonemes, where each phoneme has a target value $v_{p0}$ and a decay function g(t). The decay function is an exponential function describing the 'influence' a particular parameter has on its neighbors. The value of k is the span over which coarticulation is considered and corresponds to about 300 milliseconds. $V_{pj}$, the value of parameter p at time t, defines a trajectory in the parameter space of the mouth shapes, as shown in FIG. 24.

This generic model for coarticulation can be converted to a data-driven model. To accomplish this, videos of commonly spoken sequences of diphones, triphones and quadriphones are recorded. The trajectory of each lip parameter during articulation of the phonemes is then extracted and normalized. Even though the number of these trajectories can be large, the size of each trajectory amounts to only a few hundred bytes, therefore resulting in a compact database. To synthesize new articulations of speech, the appropriate phoneme sequences are identified in the coarticulation database and are then concatenated.

The animation of the remaining facial parts (jaw, eyes, forehead & eyebrows) may be handled by using a conventional model similar to the one developed for the MPEG4 facial animation subsystem. That is, special markers are put in the text to control amplitude, length, onset and offset of facial animations. This is a relatively easy way to provide synchronization of conversational cues, such as eye and eyebrow movements, eye blinks or head movements that accompany the spoken text.

A frame of the final animation can be generated when bitmaps of all the face parts have been retrieved from the database. The bitmap of the base face is first copied into the frame buffer, then the bitmaps of face parts are projected onto the base face using the 3D model and the pose. In a preferred embodiment of the present invention, only a limited range of rotation angles (such as ±15°) are considered so that there is no need for hidden surface removal. To avoid any artifacts from overlaying bitmaps, gradual blending or "feathering" masks are used. These masks are created by ramping up a blending value from the edges towards the center. These operations are implemented using basic OpenGL calls and the whole frame is rendered with just a few texture-map operations, which makes it possible to render the talking head in real time on a low-cost PC.

Figure 26:
FIG. 26 illustrates a series of visemes formed in accordance with the present invention.

The entire animation is driven by the output of a text-to-speech synthesizer (TTS). Starting from ASCII text input, plus some annotation controlling the intonation, the TTS produces a sound file. In addition, the TTS also outputs a phonetic transcription. This includes precise timing information for each phoneme plus some information about the stress. The animation module translates this information into a sequence of visemes, as shown in FIG. 26. The stress information can be used to guide facial expressions and head movements.

It is to be understood that the simple 3D model currently used covers a limited range of views. This is because it approximates facial parts with only a few planes, resulting in visible artifacts when the head is rotated beyond about +15° of the original sample's angle. To circumvent this limitation, the model can be augmented with new sets of samples that are extracted under different views. In this way, a wider range of possible views can be covered by switching between sets of samples depending on the pose of the base head.

Emotional expressions are generated mostly through animation of the upper part of the face or when there is no talking. More samples of mouth shapes may be added where the person is, for example, smiling while talking.

The present invention presents a novel way to create models of three-dimensional objects that can be used to generate three-dimensional, photo-realistic animations. Using image samples captured while a subject is speaking, when creating a model of a "talking head", preserves the original appearance. Image analysis techniques make it possible to compute the pose of the head and measure facial parts on tens of thousands of video frames, resulting in a rich, yet compact database of samples. A simple 3D model of the head and facial parts enables perspective projection of the samples onto a base head in a given pose, allowing head movements. The results are lively animation with a pleasing appearance that closely resembles a real person.

What is claimed is:

1. A method of creating a three-dimensional model of a three-dimensional object for generating photo-realistic animation, the method comprising the steps of:
   a) defining a set of three-dimensional planes approximating an overall shape of the three-dimensional object and its surrounding area;
   b) recording a set of images of said three-dimensional object as it undergoes both rigid movement, defined as changes in pose, and plastic deformation, defined as changes in appearances;
   c) creating a bitmap for each recorded image;
   d) storing the created bitmaps in a database, the database used to create the three-dimensional model of said three-dimensional object;
   e) preparing an empty frame to receive a synthesized view of said three-dimensional object;
   f) choosing an arbitrary pose for the synthesis of said three-dimensional object and a desired appearance;
   g) selecting, for a three-dimensional plane from the set of three-dimensional planes, a bitmap with the desired appearance, chosen in step f), from those stored in the database and determining the pose of said three-dimensional object as it appears on that bitmap;
   h) re-projecting the three-dimensional plane of said three-dimensional object from its pose on the recorded bitmap onto its new pose on the empty frame created in step e); and
   i) repeating steps g) and h) for each three-dimensional plane in the set of three-dimensional planes.

2. The method as defined in claim 1 wherein the method further comprises the step of:
   j) repeating steps e) through i) for each frame of an animation.

3. The method as defined in claim 1, wherein in performing step h), the following steps are performed:
   1) obtaining, for a selected plane from the set of three-dimensional planes, a first quadrilateral boundary marking the plane's perspective projection on the recorded image, using the pose of the object on said image;
   2) obtaining, for the selected plane, a second quadrilateral boundary on the synthesized frame, marking the plane's perspective projection using the new chosen pose of the object; and
   3) warping the pixels of the image that are bound by the first quadrilateral into the pixels of the synthesized frame bound by the second quadrilateral.

4. The method as defined in claim 3 wherein in performing step h3), bilinear interpolation is used in the warping process.

5. The method as defined in claim 3 wherein in performing step h3), pixel warping includes the method of alpha-blending using a transparency mask.

6. The method as defined by claim 1 wherein in performing step g), a feature vector is used for selecting the bitmap.

7. The method as defined in claim 6 wherein the feature vector contains one or more of the following features: the pose of the object; measurements of recognizable parts of the object obtained by computer vision algorithms from the image; statistics calculated directly from the pixels of the image; normalized bitmaps from which pixels are obtained by warping the pixels of an area of the image corresponding to the perspective projection of a plane of the object's model using the pose of the object; measurements of recognizable parts on a normalized bitmap; and statistics calculated directly from the pixels of a normalized bitmap.

8. The method as defined in claim 7 wherein the feature vectors are pre-computed from the recorded bitmaps of step b) and stored in the database, before executing step g).

9. The method as defined in claim 1 wherein the object is a human face and in performing step a), the set of three-dimensional planes approximating the overall shape of the face comprises: forehead, eyes, cheeks, mouth, chin, jaw and the entire head.

10. The method as defined in claim 9 wherein in performing step f), the pose is computed from the positions of a set of facial parts, namely: the four eye corners and the pair of nostrils.

* * * * *